United States Patent
Yang

(10) Patent No.: US 11,871,755 B2
(45) Date of Patent: Jan. 16, 2024

(54) FOOD MADE OF VEGETABLE OR FRUIT WITH FLOUR, EGG AND MILK AND METHOD OF MAKING SAME

(71) Applicant: Fushun Yang, Shanghai (CN)

(72) Inventor: Fushun Yang, Shanghai (CN)

(*) Notice: Subject to any disclaimer, the term of this patent is extended or adjusted under 35 U.S.C. 154(b) by 224 days.

(21) Appl. No.: 16/137,572

(22) Filed: Sep. 21, 2018

(65) Prior Publication Data

US 2019/0029271 A1 Jan. 31, 2019

Related U.S. Application Data

(63) Continuation of application No. PCT/CN2017/077479, filed on Mar. 21, 2017.

(30) Foreign Application Priority Data

Mar. 22, 2016 (CN) .......................... 201610163817.X

(51) Int. Cl.
    A21D 2/36     (2006.01)
    A21D 8/04     (2006.01)
    A21D 13/80    (2017.01)

(52) U.S. Cl.
    CPC ............... A21D 2/36 (2013.01); A21D 8/047 (2013.01); A21D 13/80 (2017.01)

(58) Field of Classification Search
    CPC ........... A21D 2/36; A21D 13/80; A21D 8/047

USPC .......................................................... 426/49

See application file for complete search history.

(56) References Cited

FOREIGN PATENT DOCUMENTS

| CN | 1194784 | A | | 10/1998 |
|---|---|---|---|---|
| CN | 101790999 | A | | 8/2010 |
| CN | 101849562 | A | | 10/2010 |
| CN | 102334527 | A | | 2/2012 |
| CN | 102578184 | A | * | 7/2012 |
| CN | 102578184 | A | | 7/2012 |
| CN | 103461419 | A | * | 12/2013 |
| CN | 103461419 | A | | 12/2013 |
| CN | 105309548 | A | | 2/2016 |
| EP | 1689238 | A1 | | 8/2006 |
| KR | 20120085348 | A | | 8/2012 |

OTHER PUBLICATIONS

Translation of CN-103461419-A (Year: 2013).*
Translation of CN-102578184-A (Year: 2012).*

* cited by examiner

*Primary Examiner* — Brent T O'Hern

(57) ABSTRACT

The invention discloses a food, ingredients of the food are made of vegetable or fruit, flour, egg and milk, the vegetable or fruit is fermenting and fermented paste of vegetable or fruit which is in fermentation under a condition without adding any water, sugar, and microbiological bacteria; the food is prepared by mixing, fermentating and baking a mixed and various chinese and western food products by carrying out at least one fermentation on a mixture of vegetable or fruit, flour, egg and milk.

4 Claims, No Drawings

FOOD MADE OF VEGETABLE OR FRUIT WITH FLOUR, EGG AND MILK AND METHOD OF MAKING SAME

CROSS-REFERENCE TO RELATED APPLICATIONS

This application is a continuation of International Application No. PCT/CN2017/077479, filed on Mar. 21, 2017 which claims the benefit of priority from Chinese Application No. 201610163817.X, filed on Mar. 22, 2016. The content of the aforementioned applications, including any intervening amendments thereto, are incorporated herein by reference.

TECHNICAL FIELD

The present invention discloses a bread made of vegetable or fruit with flour, egg and milk and a manufacturing method thereof, which belongs to the technical field of food processing.

BACKGROUND OF THE PRESENT INVENTION

Bread is a staple food in European and American countries. It is also increasingly popular among consumers in China and often consumed, and it has the potential to become a staple food in China. However, at present, the commercially available bread is mostly sweet and contains a lot of oil, cream, sugar, various additives and improver, etc., such that it does not be accepted as a staple food among Chinese. In addition, bread in China also has some disadvantages like single flavor, few variety and high price. Therefore, to be a staple food, nutrition and taste of bread needs to be modified to meet the preferences of ordinary Chinese people.

SUMMARY OF THE PRESENT INVENTION

In order to solve the above technical problems better, the present invention provides a mixed dough and bread with balanced nutrition, flavor and taste, which majorly includes vegetable or fruit. The mixed dough and bread is made of vegetable or fruit as a main material plus flour, egg and milk. And on this basis, various Chinese and Western food including pastry, snacks and buns are further produced.

The technical solutions of the present invention are as follow.

A staple food bread prepared from vegetable or fruit, flour, egg and milk is provided. Manufacturing method of the dough and bread includes:

grinding and pulverizing vegetables or fruits into paste slurry after picking and washing;

steaming part of the slurry over high heat for several minutes, to acquire a first production, and the first production as the fermenting vegetable or fruit paste is available to use;

taking the steamed slurry out and mixing uniformly with an appropriate amount of flour to carry out a first mixed fermentation to produce a first mixed fermented dough defined as second production after a temperature of the steamed slurry cools to a fermentable temperature; mixing the first mixed fermentation dough is mixed uniformly with eggs, milk, and a preferred active dry yeast to carry out a second mixed fermentation to produce a second mixed fermented dough contains eggs, milk and vegetables or fruits defined as the third production; baking a mixture of the second mixed fermented dough with or without adding flour and a bread dough made from the remaining part of the total slurry prepared by an extrusion concentration treatment, to produce the staple food bread; further adding or subtracting ingredients contained in the mixed fermented dough and the bread dough and separately adding or not adding an appropriate amount of oil, cream, sugar, salt, various meat food seasoning additives, and modifiers, etc.; and various Chinese and Western food, including pastry, snacks and buns, is separately produced by fermentation, division, relaxation, shaping, proofing and baking.

Grains including miscellaneous grains, potatoes and beans, vegetables, eggs, and milk are the most important foods for human beings in balanced nutrition. It is best to eat 3 to 5 or more kinds of vegetables every day and some centenarians also eat eggs and milk.

The invention fully utilizes and effectively provides the nutrition and flavor of vegetables and fruits, specifically, vegetables or fruits as core main raw materials combined with flour, eggs and milk to make a dough and staple food bread and further to make into various kinds of Chinese and Western pastry and buns food.

The manufacturing method is described below.

1. Edible portion of the selected vegetable and fruit is grinded and pulverized by a back-and-forward frictional extrusion to obtain total paste slurry. And a fiber part of leaf and stem tissue in the slurry can still be connecting. The paste slurry is rich in vegetable and fruit juice, so that there is no need to add additional water.

Part of the slurry is taken for steaming over high heat for 2 minutes. When temperature of the steamed slurry decreases to a suitable fermentation level of about 30° C., a proper amount of flour is added to mix uniformly with the steamed slurry to produce a dough. The dough can be kept warm for fermentation until the dough is soft and will become sticky soon.

Flour used in the present invention is a preferred flour which is prepared in proportion to a certain nutritional requirement and as wheat flour as the majority plus miscellaneous grains, melon powders, bean powders and potato powders;

2. According to the vegetable or fruit and flour used, a mixed dough has its optimum fermentation temperature and humidity condition, and fermentation temperature ranges from 20-34° C. and fermentation time ranges from one to several hours. The temperature of the mixed fermented dough rises in the late fermentation, thus an ambient temperature may be slightly lowered.

Upon the mixed fermented dough expanding and nutrient and flavor of the vegetable and fruit are easy to release, an appropriate amount of beaten egg, milk powder or milk, a part of the flour used to kneaded the dough and a preferred active dry yeast are added to further mix with and knead the fermented dough to prepare another mixed fermented dough for a second fermentation for one to several hours to produce one of the products by the present invention—a mixed fermented dough contained flour, egg, milk and vegetable or fruit with two mixed fermentation.

3. An appropriate amount of flour is added as a certain proportion to mix with the second mixed fermented dough prepared above.

Then the second mixed fermented dough is subjected to division, relaxation, shaping, proofing treatments to produce a bread dough.

The bread dough is baked under a temperature of about 180° C.-200° C. for ten to twenty extra minutes to produce a better-tasting staple food bread.

4. The remaining part of the total slurry produced by grinding and pulverizing vegetables or fruits may be subjected to an extrusion concentration treatment to remove some water and then added to the mixed fermented dough or the bread dough and other further prepared Chinese and Western pastry snacks and buns by mixing, filling, stuffing, filling, etc.

And meat, poultry, fish and other foodstuffs are added in the same way. 5. The mixed fermented dough and the bread dough may be used as a steamed stuff bun billet/skin, a steamed bun billet/skin, a sesame seed cake billet/skin and a moon cake billet/skin, etc.

6. The mixed fermented dough and the bread dough may be provided with an appropriate amount of egg liquid, milk powder or milk, cream, cooking oil and various food additives and modifiers, etc.

Each of them has its own suitable and unique shape and is made into products with different nutrients, flavors and tastes according to the conventional process, such as various Chinese and Western pastry snacks, dumplings and buns including cloud cake, sachima, moon cake, various biscuits, cookie, cake, almond crisp, apricot biscuit, egg roll, butterfly crisp, almond row, thereby improving the nutrition, flavor and taste.

The advantages of the present invention are described below:

The invention discloses a mixed fermenting and fermented vegetable or fruit paste fermented dough and a bread dough with original vegetable or fruit flavor which are produced by an unique method including combination of vegetable or fruit and flour and fermentation. In the production, no additives are added, and even without adding the traditionally recognized bread ingredients such as cooking oil, butter, water, sugar and salt. The flavor and nutrition of the mixed fermented dough and the bread dough are from vegetable and fruit and the dough is further processed to a staple food bread with an addition of egg, milk and flour.

Certainly, in order to satisfy consumers' various tastes, various seasoning packages such as olive oil packets, honey packets, powdered sugar packets, spicy sauce packets, savory sauce packets, jam packets, etc. may be provided for the products of the present invention in placing or onsite supply.

Similarly, there are also various types of products with low sugar and less oil produced according to the production method of the present invention which are prepared in advance according to product specifications.

The food such as the staple food bread of the invention meets the requirements of the modern food safety and nutrition and health care concept, and is an environmentally friendly product which is beneficial to green and energy conservation. The food of the invention will have a certain impact on food production and sales. For example, it just takes a few hours to prepare this product from production to bread baking even including all fermentation time. While other conventional bread production with only one fermentation process lasts more than one day. This product can also be frozen and refrigerated, but it is suitable for making in a central factory and then delivered to a store close to consumers due to an absence of preservatives, leavening agents, modifiers, etc. The product baked on the same day and on-site has a shelf life of at least 3-5 days at normal temperature. Consumers can also receive the food of the present invention in a shorter time by express delivery after placing the order. After dozens of vegetables and fruits for trial production, the products of the present invention have common features of "fresh, fragrant, soft, moisten, easy to digest, and nutritious".

DETAILED DESCRIPTION OF THE PRESENT INVENTION

Detailed embodiments are described below.

Example 1: potato is another large type of staple food after rice, wheat and corn. The vegetable used in the invention is potato, the potato, egg, and milk are used to produce a potato egg milk staple food bread.

Example 2: the vegetable used is greens or spinach or leeks or pumpkin or celery or eggplant or cucumber or radish, or a combination of several of them, the vegetable, egg, and milk are used to produce a vegetable egg milk staple food bread.

Example 3: the fruit used is apple or pear or banana or orange or grape or kiwi or red jujube or commercially available roasted jujube or a combination of several of them, the fruit, egg, and milk are used to produce a fruit egg milk staple food bread.

Example 4: Meat, such as minced meat, meat strips and shredded meat, is added by stuffing, wrapping, and surface filling to produce a vegetable or fruit egg milk staple food bread contained meat.

Example 5: The mixed fermented dough and the bread dough of the present invention are further processed by simultaneous addition or subtraction of the ingredients previously added and conventional ingredients such as oil, sugar, salt and the like, to produce various Chinese and Western food including pastry, snacks, stuffed moon cake and buns.

What is claimed is:

1. A food, wherein ingredients of a recipe of the food are made of vegetable or fruit, and flour, egg, milk and yeast; wherein the food is obtained by 1) processing the vegetable or the fruit into vegetable paste or fruit paste followed by steaming for two minutes; cooling the vegetable paste or the fruit paste to a fermentable temperature; 2) mixing the vegetable paste or the fruit paste at the fermentable temperature with the flour followed by fermentation at 20-34° C. for one hour or more under a condition without adding any yeast, water, salt, sugar, oil and microbiological bacteria to obtain a first mixed fermented dough; 3) adding the first mixed fermented dough with the flour, the egg and the milk followed by fermentation with the yeast to obtain a second mixed fermented dough; subjecting the second mixed fermented dough to division, relaxation, shaping, proofing and baking to obtain the food.

2. The food of claim 1, wherein the vegetable comprises at least one kind of vegetable.

3. The food of claim 1, wherein the fruit comprises at least one kind of fruit.

4. A food, wherein ingredients of a recipe of the food are made of vegetable or fruit, and flour, egg, milk and yeast; wherein the food is obtained by processing the vegetable or the fruit into vegetable paste or fruit paste; steaming part of the vegetable paste or part of the fruit paste for two minutes; cooling the part of the vegetable paste or the part of the fruit paste to a fermentable temperature; mixing the part of the vegetable paste or the part of the fruit paste at the fermentable temperature with the flour followed by fermentation at 20-34° C. for one hour or more under a condition without adding any yeast, water, salt, sugar, oil and microbiological bacteria to obtain a first mixed fermented dough; adding the first mixed fermented dough with the flour, the egg and the milk followed by fermentation with the yeast to obtain a second mixed fermented dough; subjecting a remaining part of the vegetable paste or a remaining part of the fruit paste to extrusion concentration treatment to remove water; and adding a remaining part of the vegetable paste or a remaining part of the fruit paste after extrusion concentration treatment to the second mixed fermented dough by mixing, filling or stuffing followed by division, relaxation, shaping, proofing and baking to obtain the food.

* * * * *